S. SABALALA.
CAR BRAKE.
APPLICATION FILED MAY 23, 1917. RENEWED FEB. 10, 1919.

1,297,915. Patented Mar. 18, 1919.

WITNESSES
C. F. Rudolph
H. T. Pierson

INVENTOR
Santie Sabalala,
BY Victor J. Evans
ATTORNEY

UNITED STATES PATENT OFFICE.

SANTIE SABALALA, OF CLEVELAND, OHIO.

CAR-BRAKE.

1,297,915. Specification of Letters Patent. Patented Mar. 18, 1919.

Application filed May 23, 1917, Serial No. 170,482. Renewed February 10, 1919. Serial No. 276,245.

*To all whom it may concern:*

Be it known that I, SANTIE SABALALA, a subject of the King of Great Britain, residing at Cleveland, in the county of Cuyahoga and State of Ohio, have invented new and useful Improvements in Car-Brakes, of which the following is a specification.

This invention is a car brake of the type that operates on the track rails, thus utilizing the weight of the car to increase the friction, and operating in conjunction with the actual brake movement that is produced by the action of compressed air.

One object of the invention is to provide a brake that will be reliable, quick in action, and one that will produce a maximum retarding effect on its application.

Another object is to provide a brake that will consist of few parts, simple in structure, and one in which, by reason of the leverage employed, the application of a small operating force will produce a maximum pressure against the rails.

A further object is to provide a track brake that will be operated by air to produce a maximum application of the braking force and retarding effect.

The invention, broadly stated, comprises in addition to the usual truck, a rock shaft coöperatively connected to the piston rod of an air brake cylinder, a plurality of levers operatively connected to the rock shaft, depending members secured to the side frames of the truck, a pivotal connection carried by each of the depending members adjacent the lower end, for operative connection with certain of said levers, brake shoes connected for operative movement by certain levers and adapted to be positioned in contact with the track rails for producing friction to retard the movement of the car, and means to connect the several braking elements or members for simultaneous operation at each end of the truck.

One practical application and construction of the invention will be described and illustrated in the accompanying drawing, in which:—

In the preferred embodiment about to be described, the invention is mounted upon a truck having the usual side frames indicated at 5 and 6. The body 7 of the car is provided with the usual center bearing indicated at 8, and has the pin 9 to allow a pivotal action between the bearing and the body 7, the floor line of the body 7 being the only part shown.

Figure 1:
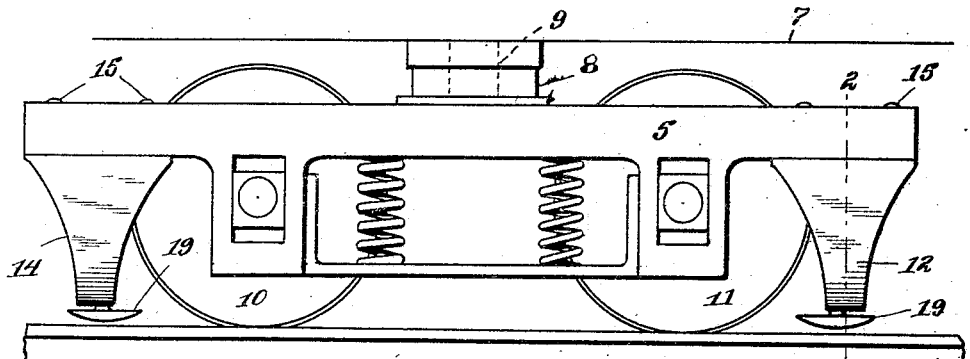
Figure 1 is a side elevation of a truck with the brakes carried thereby.

The entire truck may be of the usual type employed, and as shown in Fig. 1, it is provided with four wheels, two of which are indicated at 10 and 11. These wheels are mounted in suitable journals of the customary type.

Adjacent the ends of each of the frames 5 and 6 are two supports or depending members indicated at 12 and 13. At the other end of the frame the depending member 14 is shown. Each of these depending members is secured to the truck frame by means of headed bolts indicated at 15. These bolts may be provided with suitable castellated nuts indicated at 16, and the bolts may be provided with spurs through which cotter pins may be inserted to coöperate with the slots formed in the nuts 16. This will serve to prevent the nut 16 from turning off the end of the bolt 15.

Figure 2:
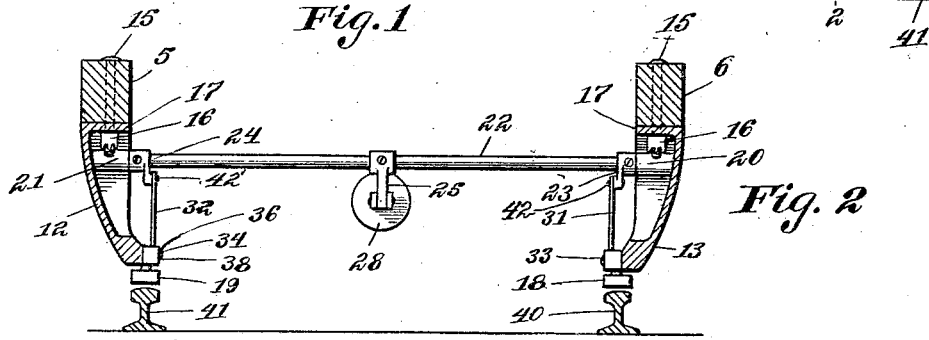
Fig. 2 is a sectional view on the line 2—2 of Fig. 1.

As shown in Fig. 2 the depending members 12 and 13 are secured to the under side of the frames 5 and 6, respectively. Each of these depending members is provided with a base portion indicated at 17. The depending members in extending downwardly from the base portion 17 curve inwardly so that their free ends lie over the track rails but spaced away a sufficient distance to provide a clearance for the brake shoes indicated at 18 and 19. Extending between the members 12 and 13, and suitably journaled therein, as indicated at 20 and 21, is a rock shaft 22. Spaced on this rock shaft 22 are the arms 23 and 24. The rock shaft 22 carries at a point intermediate of its journaled ends an arm 25 to which is connected the rod 26.

The rod 26 is coupled to the piston rod 27 which carries the piston within the air brake cylinder 28. The arm 25 is provided with a pivotal connection indicated at 29, so that it may have free movement with the connecting rod 26, and the connecting rod 26 is provided with a suitable connection indicated at 30, so as to have movement relative to the piston 27. These two connections 29 and 30 permit of a vertical movement between the rectilinear motion of the piston rod 27 and the arm 25. The arms 23 and 24 are pivotally connected to the links 31 and 32. These links 31 and 32 are pivotally connected to links indicated at 33 and 34.

The links 33 and 34 have a pivotal connection with the depending members 12 and 13, the pivotal connection for the link 33 being indicated at 35.

Figure 4:
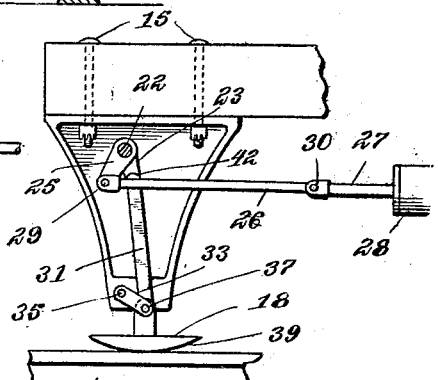
Fig. 4 is a view similar to that in Fig. 3, but showing the brake shoe in contact or engagement with the track rail.

Mounted to partly rotate on the pivotal connections indicated at 36 and 37 are the brake shoes 18 and 19. As shown in Fig. 4, the brake shoe 18 is provided with a rounded friction surface indicated at 39. This rounded surface is adapted to be forced into contact with the track rail indicated at 40. The other track rail is indicated at 41.

The pivotal connection between the link 31 and the arm 23 is indicated at 42, and the pivotal connection between the link 32 and the arm 24 is indicated at 42'. The braking elements carried at the other end of the truck frame where one depending member 14 is shown are of a similar type of construction and arrangement of parts to those indicated at the right hand end of Fig. 1. The rock shafts may be suitably connected together in any workmanlike manner to secure a simultaneous movement of the four brake shoes into engagement with the track rails 40 and 41.

Figure 3:
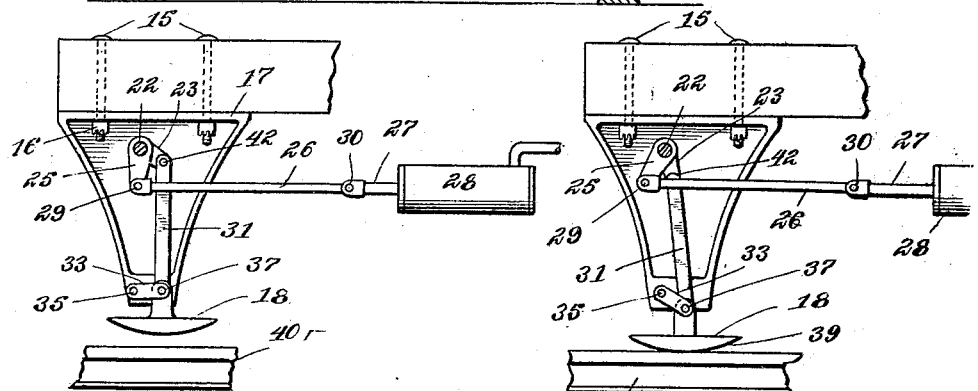
Fig. 3 is a detail view of the levers connected to one brake shoe.

As shown more particularly in Fig. 3, the movement of the piston rod 27 from within the cylinder 28 moves the arm 25 connected to the rock shaft 22, which in turn rotates the arms 23 that act to force the links 31 and 32 downward. The downward movement is communicated to the brake shoes indicated at 18 and 19 and by the difference in lengths between the pivotal connections of the several levers, links and arms, the pressure exerted against the track rails by the brake shoes is multiplied relatively to the pressure exerted within the brake cylinder 28. The piston rod 27 moves over relatively a long distance with a small force while the brake shoes move a short distance with a large force. A continuation of the movement of the piston rod 27 will tend to force the arm 25 upward toward a horizontal position at which time the rock shaft 22 will rotate the arms 23 and 24.

When the axes of the arms 23 and 24 are in alinement with the axes of the links 31 and 32 no further downward motion will be communicated to the brake shoes. When this condition obtains the several linkages and levers tend to support the weight of the car upon the brake shoes. This will produce a greater frictional contact with the rails than that produced ordinarily by the customary movement of the piston rod 27. Forcing these several arms and their links into a straight line will have the effect of producing an emergency application of the braking force, that is to say the braking effect will be at a maximum as it will then have coupled with the usual braking force the weight of the car.

Minor changes in the form, proportions, and details of construction may be resorted to without departing from the spirit of the invention or the scope of the appended claim.

What is claimed as new is:—

The combination with a railway truck, of supports depending therefrom in substantial alinement with the rails to a track, a rock shaft mounted in said supports and extending transversely across the track and having bearings in said supports near the upper ends thereof, arms secured to and rotatable with said rock shaft adjacent the supports, links pivotally secured to the supports near the lower ends thereof, brake shoes pivotally connected to the free ends of the links between the latter and said supports, links connecting the brake shoes and the arms, and fluid pressure means connected to the rock shaft for moving the shoes into engagement with the track rails.

In testimony whereof I affix my signature.

SANTIE SABALALA.

Copies of this patent may be obtained for five cents each, by addressing the "Commissioner of Patents, Washington, D. C."